United States Patent
Ikeda et al.

(10) Patent No.: US 12,399,401 B2
(45) Date of Patent: *Aug. 26, 2025

(54) LIQUID CRYSTAL DEVICE

(71) Applicant: JAPAN DISPLAY INC., Tokyo (JP)

(72) Inventors: Kojiro Ikeda, Tokyo (JP); Takeo Koito, Tokyo (JP); Koichi Nagao, Tokyo (JP); Shinichiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,455

(22) Filed: Jun. 21, 2024

(65) Prior Publication Data

US 2024/0337878 A1 Oct. 10, 2024

Related U.S. Application Data

(63) Continuation of application No. 18/367,116, filed on Sep. 12, 2023, now Pat. No. 12,078,891, which is a
(Continued)

(30) Foreign Application Priority Data

Mar. 12, 2021 (JP) .................. 2021-040606

(51) Int. Cl.
*G02F 1/1337* (2006.01)
*G02F 1/1343* (2006.01)
*G02F 1/1347* (2006.01)

(52) U.S. Cl.
CPC ...... *G02F 1/1337* (2013.01); *G02F 1/134309* (2013.01); *G02F 1/1347* (2013.01); *G02F 2201/124* (2013.01)

(58) Field of Classification Search
CPC ............ G02F 1/1337; G02F 1/134309; G02F 1/1347; G02F 1/29; G02F 1/292; G02F 2201/124
See application file for complete search history.

(56) References Cited

U.S. PATENT DOCUMENTS 12,078,891 B2 * 9/2024 Ikeda .................. G02F 1/13471
2010/0149444 A1 6/2010 Hikmet et al.
(Continued)

FOREIGN PATENT DOCUMENTS

| JP | 2006-030838 A | 2/2006 |
| JP | 2010-525388 A | 7/2010 |
| JP | 2010-230887 A | 10/2010 |

OTHER PUBLICATIONS

English translation of Office Action issued in related Japanese Patent Application No. 2023-505244, mailed on Sep. 10, 2024. 3 pages.
(Continued)

*Primary Examiner* — Michael H Caley
*Assistant Examiner* — David Y Chung
(74) *Attorney, Agent, or Firm* — K&L Gates LLP

(57) ABSTRACT

According to one embodiment, a liquid crystal device includes a first liquid crystal cell and a second liquid crystal cell. The first liquid crystal cell and the second liquid crystal cell each include a first strip electrode, a second strip electrode, a third strip electrode and a fourth strip electrode. The extension direction of each of the first strip electrode and the second strip electrode in the first liquid crystal cell is different from the extension direction of each of the first strip electrode and the second strip electrode in the second liquid crystal cell. The extension direction of each of the first strip electrode and the second strip electrode is orthogonal to
(Continued)

the extension direction of each of the third strip electrode and the fourth strip electrode.

8 Claims, 12 Drawing Sheets

Related U.S. Application Data continuation of application No. PCT/JP2022/005860, filed on Feb. 15, 2022.

(56) References Cited

U.S. PATENT DOCUMENTS

| | | |
|---|---|---|
| 2016/0252782 A1 | 9/2016 | Wang et al. |
| 2019/0025657 A1 | 1/2019 | Presniakov et al. |
| 2020/0050076 A1 | 2/2020 | Galstian et al. |

OTHER PUBLICATIONS

Search Report issued in related International Patent Application No. PCT/JP2022/005860 on May 10, 2022 and English translation of same. 5 pages.
Written Opinion issued in related International Patent Application No. PCT/JP2022/005860 on May 10, 2022. 4 pages.
Extended European Search Report issued in related European Patent Application No. 22766750.8, dated Feb. 24, 2025. 9 pages.

* cited by examiner

F.I.G. 2

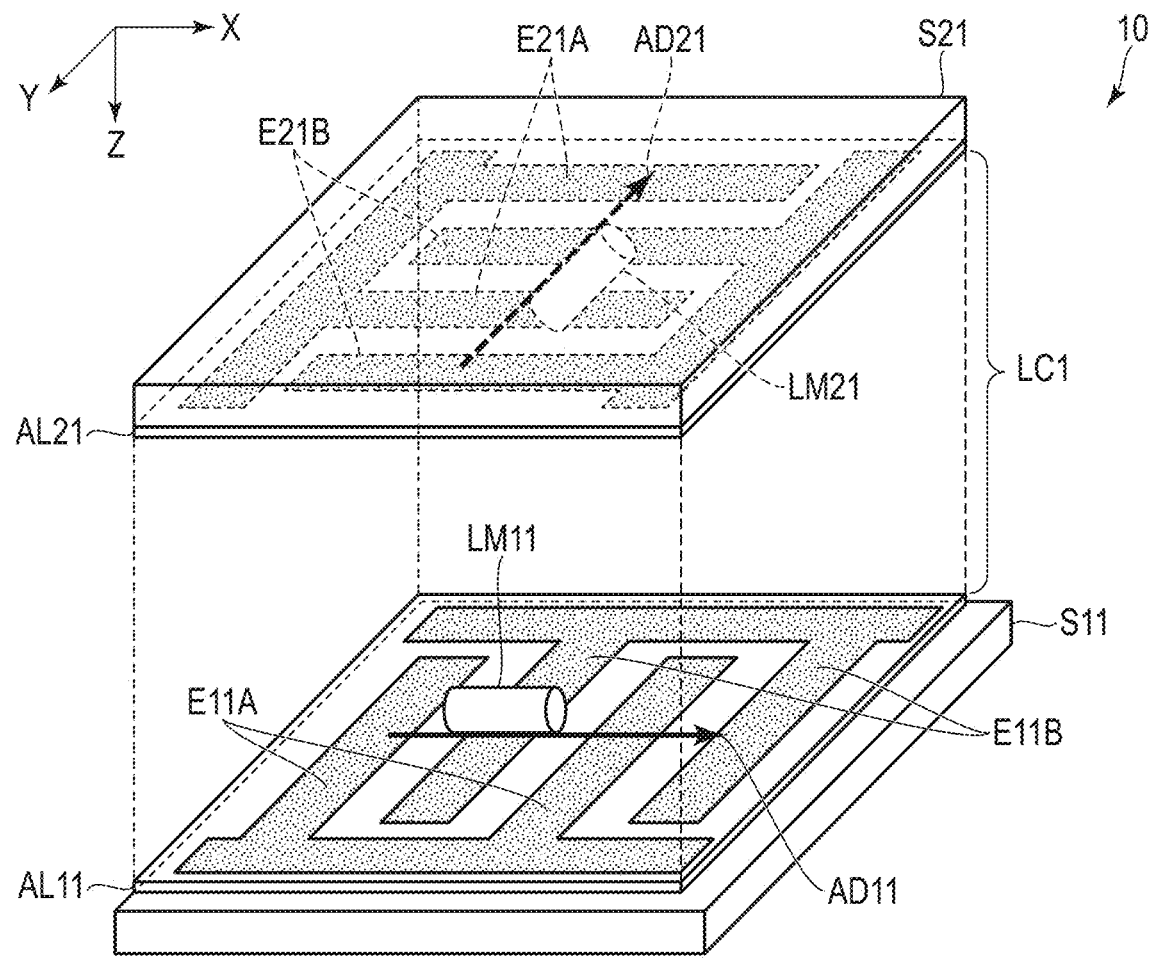
F I G. 3

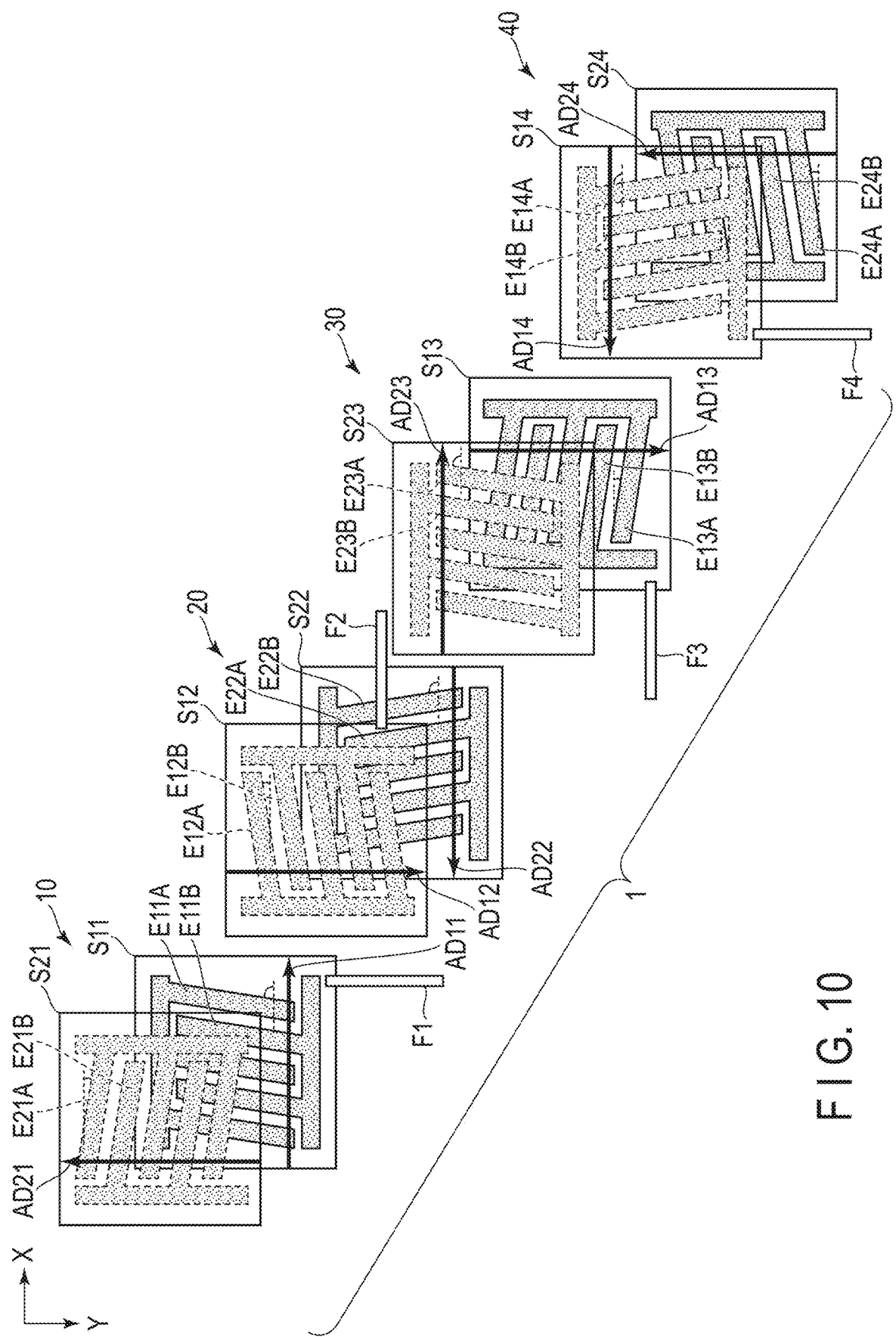
F I G. 10

LIQUID CRYSTAL DEVICE

CROSS-REFERENCE TO RELATED APPLICATIONS

This application is a continuation application of U.S. patent application Ser. No. 18/367,116, filed on Sep. 12, 2023, which is a continuation application of PCT Application No. PCT/JP2022/005860, filed Feb. 15, 2022 and based upon and claiming the benefit of priority from Japanese Patent Application No. 2021-040606, filed Mar. 12, 2021, the entire contents of all of which are incorporated herein by reference.

FIELD

Embodiments described herein relate generally to a liquid crystal device.

BACKGROUND

In recent years, light control devices using liquid crystal cells have been proposed. Such a light control device controls an alignment state of liquid crystal molecules or a refractive index distribution of a liquid crystal layer to refract light (p-polarized light and s-polarized light) passing through the liquid crystal layer. As one example, a technique of suppressing unevenness by forming strip-shaped electrodes for forming the respective liquid crystal lenses at mutually displaced positions, in an illumination device having a plurality of liquid crystal lenses, has been proposed.

BRIEF DESCRIPTION OF THE DRAWINGS

FIG. 3 is a perspective view schematically showing the first liquid crystal cell 10 of FIG. 2.

FIG. 10 is a diagram showing yet another example of the extension of direction of each strip electrode that constitutes the liquid crystal device 1.

DETAILED DESCRIPTION

Figure 1:
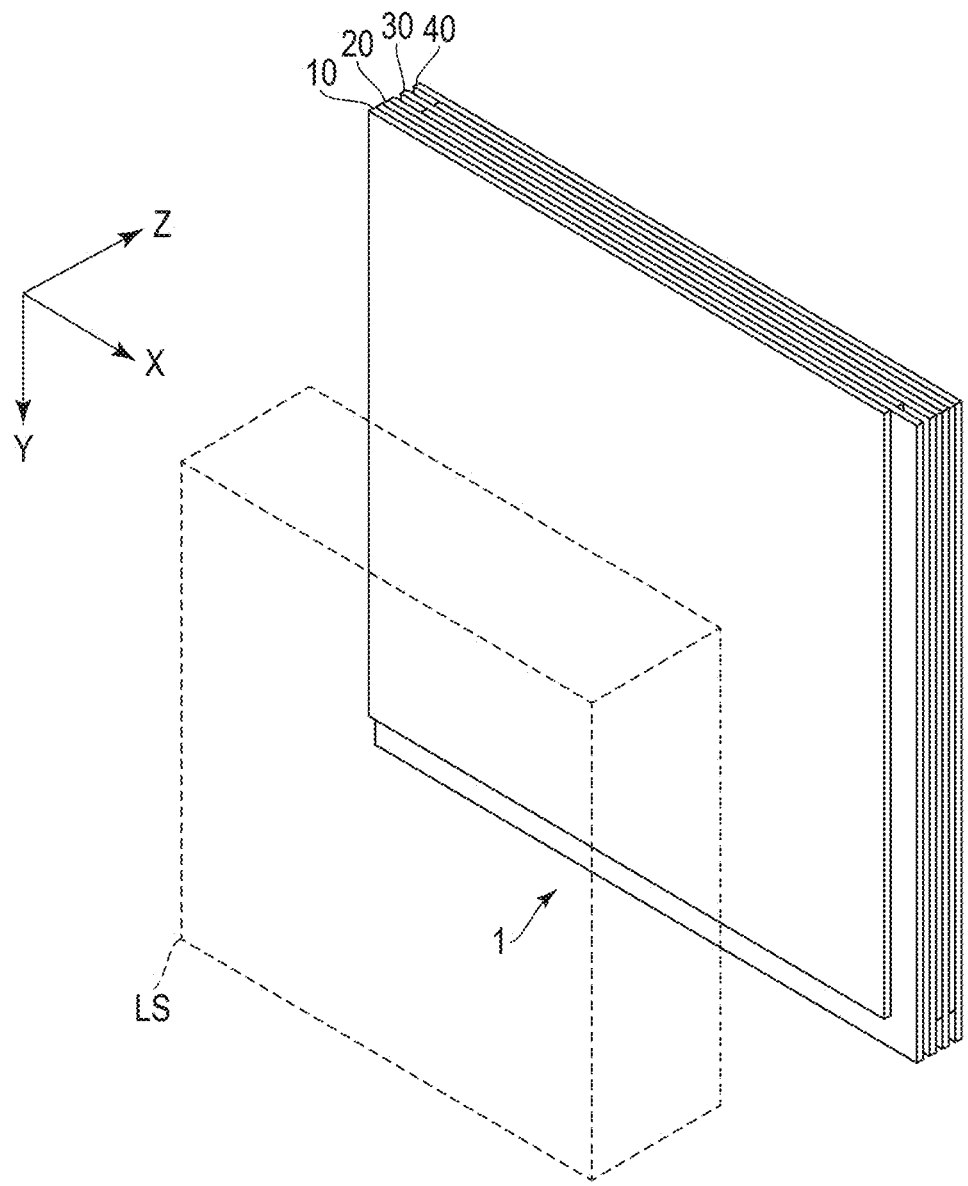
FIG. 1 is a perspective view showing a liquid crystal device 1 according to the present embodiment.

Embodiments described herein aim to provide a liquid crystal device in which it is possible to suppress moire.

In general, according to one embodiment, a liquid crystal device includes a first liquid crystal cell and a second liquid crystal cell overlapping the first liquid crystal cell, each of the first liquid crystal cell and the second liquid crystal cell includes a first transparent substrate, a first alignment film, a first strip electrode and a second strip electrode located between the first transparent substrate and the first alignment film, arranged at an interval, and configured to have mutually different voltages applied thereto, a second transparent substrate, a second alignment film, a third strip electrode and a fourth strip electrode located between the second transparent substrate and the second alignment film, arranged at an interval, and configured to have mutually different voltages applied thereto, and a liquid crystal layer located between the first alignment film and the second alignment film, an extension direction of each of the first strip electrode and the second strip electrode in the first liquid crystal cell is different from an extension direction of each of the first strip electrode and the second strip electrode in the second liquid crystal cell, and in each of the first liquid crystal cell and the second liquid crystal cell, the extension direction of each of the first strip electrode and the second strip electrode is orthogonal to an extension direction of each of the third strip electrode and the fourth strip electrode in plan view.

According to the embodiment, a liquid crystal device capable of suppressing moire can be provided.

Embodiments will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane. Viewing the X-Y plane is referred to as plan view.

FIG. 1 is a perspective view showing a liquid crystal device 1 according to the present embodiment.

A liquid crystal device 1 comprises a first liquid crystal cell 10, a second liquid crystal cell 20, a third liquid crystal cell 30, and a fourth liquid crystal cell 40. The liquid crystal device 1 according to the present embodiment comprises two or more liquid crystal cells, and is not limited to the configuration comprising four liquid crystal cells, unlike the example shown in FIG. 1.

The first liquid crystal cell 10, the second liquid crystal cell 20, the third liquid crystal cell 30, and the fourth liquid crystal cell 40 overlap in this order in the third direction Z.

A light source LS represented by a dotted line is opposed to the first liquid crystal cell 10 in the third direction Z. The light source LS is desirably configured to emit collimated light, but can also adopt a configuration of emitting diffused light. The light emitted from the light source LS passes through the first liquid crystal cell 10, the second liquid crystal cell 20, the third liquid crystal cell 30, and the fourth liquid crystal cell 40 in order. As described later, the first liquid crystal cell 10, the second liquid crystal cell 20, the third liquid crystal cell 30, and the fourth liquid crystal cell 40 are configured to refract several polarization components of the incident light. An illumination device capable of diffusing and converging light can be provided by thus combining the liquid crystal device 1 and the light source LS.

Figure 2:
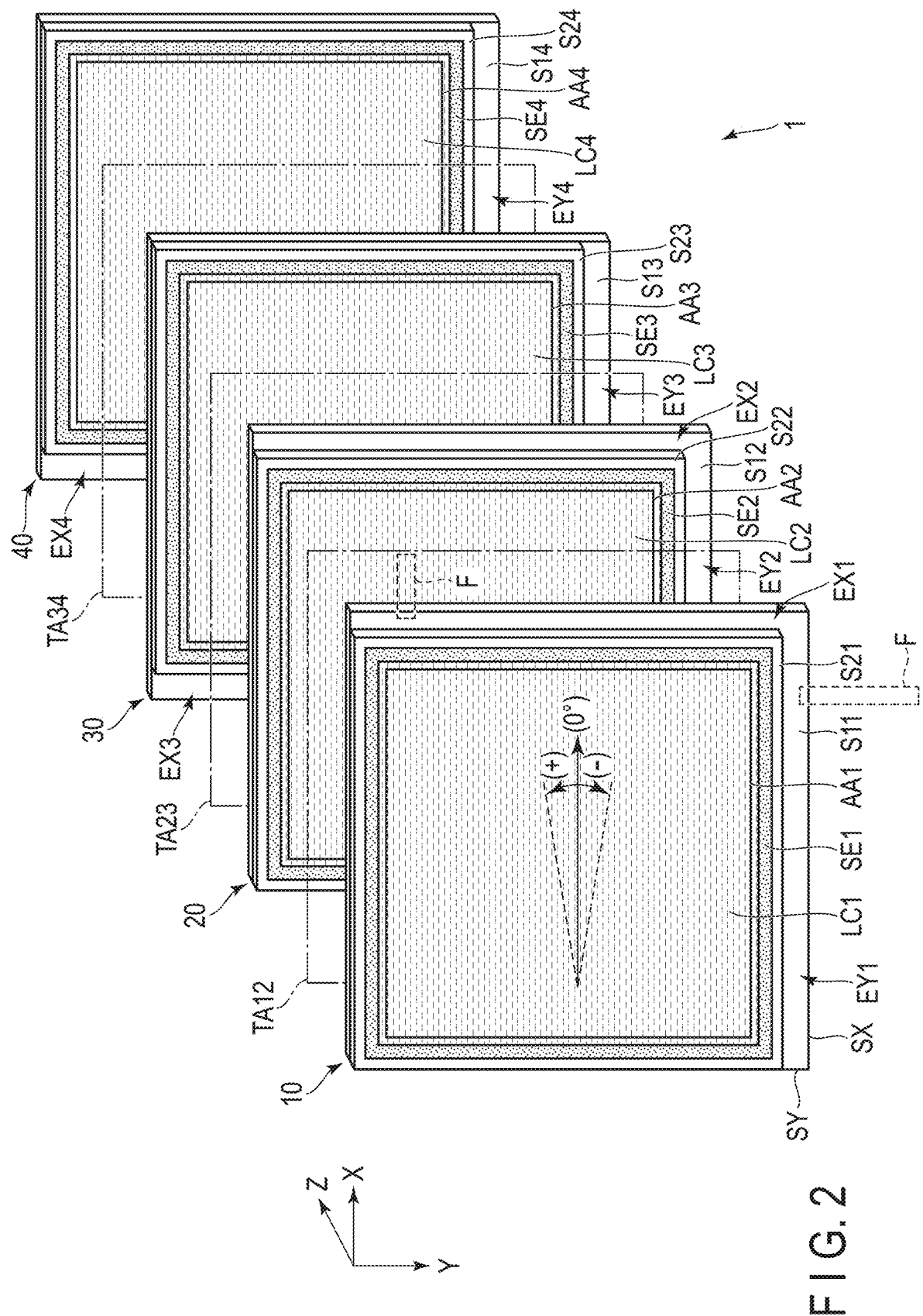
FIG. 2 is an exploded perspective view of the liquid crystal device 1 shown in FIG. 1.

FIG. 2 is an exploded perspective view of the liquid crystal device 1 shown in FIG. 1.

The first liquid crystal cell 10 comprises a first transparent substrate S11, a second transparent substrate S21, a liquid crystal layer LC1, and a seal SE1. The first transparent substrate S11 and the second transparent substrate S21 are bonded with the seal SE1. The liquid crystal layer LC1 is held between the first transparent substrate S11 and the second transparent substrate S21 and sealed with the seal SE1. An effective area AA1 where incident light can be refracted is formed on an inner side surrounded by the seal SE1.

In the present specification, when one side SY located at the left end of the first transparent substrate S11 is referred to as a reference in plan view of the first liquid crystal cell 10, a direction orthogonal to the side SY is defined as a first direction X, a direction parallel to the side SY is defined as a second direction Y, and a direction (thickness direction) orthogonal to the first direction X and the second direction Y is defined as a third direction Z. In addition, based on the side SY, a direction of three o'clock on the X-Y plane, i.e., a tip direction of an arrow indicating the first direction X is referred to as 0°, and an angle counterclockwise with respect to the first direction X is positive (+), and an angle clockwise with respect to the first direction X is referred to as negative (−). A tip direction of an arrow indicating the second direction Y corresponds to the direction at 90° with respect to the first direction X.

Such correspondence in each direction can also be applied to the other liquid crystal cells 20 to 40 in the same manner.

The first transparent substrate S11 includes an extending portion EX1 which extends to the outside of the second transparent substrate S21 along the first direction X, and an extending portion EY1 which extends to the outside of the second transparent substrate S21 along the second direction Y. A flexible wiring board F as represented by a dotted line is connected to at least one of the extending portion EX1 and the extending portion EY1.

The second liquid crystal cell 20 comprises a first transparent substrate S12, a second transparent substrate S22, a liquid crystal layer LC2, and a seal SE2. An effective area AA2 is formed on an inner side surrounded by the seal SE2.

The first transparent substrate S12 includes an extending portion EX2 and an extending portion EY2. In the third direction Z, the extending portion EX2 overlaps the extending portion EX1, and the extending portion EY2 overlaps the extending portion EY1. A flexible wiring board is connected to at least one of the extending portion EX2 and the extending portion EY2, but the illustration of the flexible wiring board is omitted in the liquid crystal cells 20 to 40.

The third liquid crystal cell 30 comprises a first transparent substrate S13, a second transparent substrate S23, a liquid crystal layer LC3, and a seal SE3. An effective area AA3 is formed on an inner side surrounded by the seal SE3.

The first transparent substrate S13 includes an extending portion EX3 and an extending portion EY3. The extending portion EY3 overlaps the extending portion EY2 in the third direction Z. The extending portion EX3 does not overlap the extending portion EX2 and is located on an opposite side of the extending portion EX2.

The fourth liquid crystal cell 40 comprises a first transparent substrate S14, a second transparent substrate S24, a liquid crystal layer LC4, and a seal SE4. An effective area AA4 is formed on an inner side surrounded by the seal SE4.

The first transparent substrate S14 includes an extending portion EX4 and an extending portion EY4. In the third direction Z, the extending portion EX4 overlaps the extending portion EX3, and the extending portion EY4 overlaps the extending portion EY3.

A transparent adhesive layer TA12 is arranged between the first liquid crystal cell 10 and the second liquid crystal cell 20. The transparent adhesive layer TA12 adheres the first transparent substrate S11 to the second transparent substrate S22.

A transparent adhesive layer TA23 is arranged between the second liquid crystal cell 20 and the third liquid crystal cell 30. The transparent adhesive layer TA23 adheres the first transparent substrate S12 to the second transparent substrate S23.

A transparent adhesive layer TA34 is arranged between the third liquid crystal cell 30 and the fourth liquid crystal cell 40. The transparent adhesive layer TA34 adheres the first transparent substrate S13 to the second transparent substrate S24.

Each of the first transparent substrates S11 to S14 is formed in a square shape and has an equal size. For example, in the first transparent substrate S11, the side SX and the side SY are orthogonal to each other, and the length of the side SX is the same as the length of the side SY.

For this reason, when the first liquid crystal cell 10, the second liquid crystal cell 20, the third liquid crystal cell 30, and the fourth liquid crystal cell 40 are adhered to each other, their sides along the first direction X overlap each other and their sides along the second direction Y also overlap each other, as shown in FIG. 1.

The second substrate having substantially the same shape as the shape of the area through which light is transmitted (effective area to be described later) can be formed in a square shape, and the first substrate can be formed in a polygonal shape other than the square shape, such as a rectangular shape. In addition, a configuration in which one of the extending portions of each liquid crystal cell is removed can also be employed.

Next, the configuration of each liquid crystal cell will be described more specifically. The first liquid crystal cell 10 of the plurality of liquid crystal cells constituting the liquid crystal device 1 will be exemplified below, but configurations of the other liquid crystal cells 20 to 40 are substantially the same as the configuration of the first liquid crystal cell 10 except for the extension direction of the strip electrode.

FIG. 3 is a perspective view schematically showing the first liquid crystal cell 10 of FIG. 2.

The first liquid crystal cell 10 comprises a first strip electrode E11A and a second strip electrode E11B, a first alignment film AL11, a third strip electrode E21A and a fourth strip electrode E21B, and a second alignment film AL21, in the effective area AA1.

The first strip electrode E11A and the second strip electrode E11B are located between the first transparent substrate S11 and the first alignment film AL11, are spaced apart, and extend in the same direction. The first strip electrode E11A and the second strip electrode E11B may be in contact with the first transparent substrate S11 or an insulating film may be interposed between the electrodes and the first transparent substrate S11. In addition, an insulating film may be interposed between the first strip electrode E11A and the second strip electrode E11B, and the first strip electrode E11A may be located in a layer different from the second strip electrode E11B.

A plurality of first strip electrodes E11A and a plurality of second strip electrodes E11B are arranged in the first direction X and alternately arranged. The plurality of first strip electrodes E11A are electrically connected to each other and configured to have the same voltage applied thereto. The plurality of second strip electrodes E11B are electrically connected to each other and configured to have the same voltage applied thereto. However, the voltage applied to the second strip electrodes E11B is controlled so as to be different from the voltage applied to the first strip electrodes E11A.

The first alignment film AL11 covers the first strip electrodes E11A and the second strip electrodes E11B. An alignment treatment direction AD11 of the first alignment film AL11 is the first direction X. The alignment treatment of each alignment film may be a rubbing treatment or a photo-alignment treatment. The alignment treatment direction is referred to as a rubbing direction in some cases. In general, when no voltage is applied to the liquid crystal layer (initial alignment state), the liquid crystal molecules located near the alignment film are initially aligned in a predetermined direction by the alignment restriction force along the alignment treatment direction of the alignment film. In other words, in the example shown here, the initial alignment direction of the liquid crystal molecules LM11 along the first alignment film AL11 is the first direction X. The alignment treatment direction AD11 intersects with the first strip electrodes E11A and the second strip electrodes E11B.

The third strip electrode E21A and the fourth strip electrode E21B are located between the second transparent substrate S21 and the second alignment film AL21, are spaced apart, and extend in the same direction. The third strip electrode E21A and the fourth strip electrode E21B may be in contact with the second transparent substrate S21 or an insulating film may be interposed between the electrodes and the second transparent substrate S21. Alternatively, an insulating film may be interposed between the third strip electrode E21A and the fourth strip electrode E21B, and the third strip electrode E21A may be located in a layer different from the fourth strip electrode E21B.

A plurality of third strip electrodes E21A and a plurality of fourth strip electrodes E21B are arranged in the second direction Y and alternately arranged. The plurality of third strip electrodes E21A are electrically connected to each other and configured to have the same voltage applied thereto. The plurality of fourth strip electrodes E21B are electrically connected to each other and configured to have the same voltage applied thereto. However, the voltage applied to the fourth strip electrodes E21B is controlled so as to be different from the voltage applied to the third strip electrodes E21A. In addition, the extension direction of each of the first strip electrodes E11A and the second strip electrodes E11B is orthogonal to the extension direction of each of the third strip electrodes E21A and the fourth strip electrodes E21B, which will be described later in detail.

The second alignment film AL21 covers the third strip electrodes E21A and the fourth strip electrodes E21B. An alignment treatment direction AD21 of the second alignment film AL21 is the second direction Y. In other words, in the example shown here, the initial alignment direction of the liquid crystal molecules LM21 along the second alignment film AL21 is the second direction Y. In addition, the alignment treatment direction AD11 of the first alignment film AL11 and the alignment treatment direction AD21 of the second alignment film AL21 are orthogonal to each other. The alignment treatment direction AD21 intersects with the third strip electrodes E21A and the fourth strip electrodes E21B.

Several examples will be described below. In each of the examples, the extension directions of the first strip electrodes and the second strip electrodes, and the extension directions of the third strip electrodes and the fourth strip electrodes, in each of the first liquid crystal cell 10, the second liquid crystal cell 20, the third liquid crystal cell 30, and the fourth liquid crystal cell 40, will be described. It is assumed that the extension direction of the first strip electrode is the same as that of the second strip electrode and that the extension direction of the third strip electrode is the same as that of the fourth strip electrode. Each of the first strip electrodes, second strip electrodes, third strip electrodes, and fourth strip electrodes has an edge extending linearly. The extension direction of each strip electrode will be described below as an angle formed between the first direction X, which is a common reference direction, and the edge of the strip electrode.

Example 1-1

Figure 4:
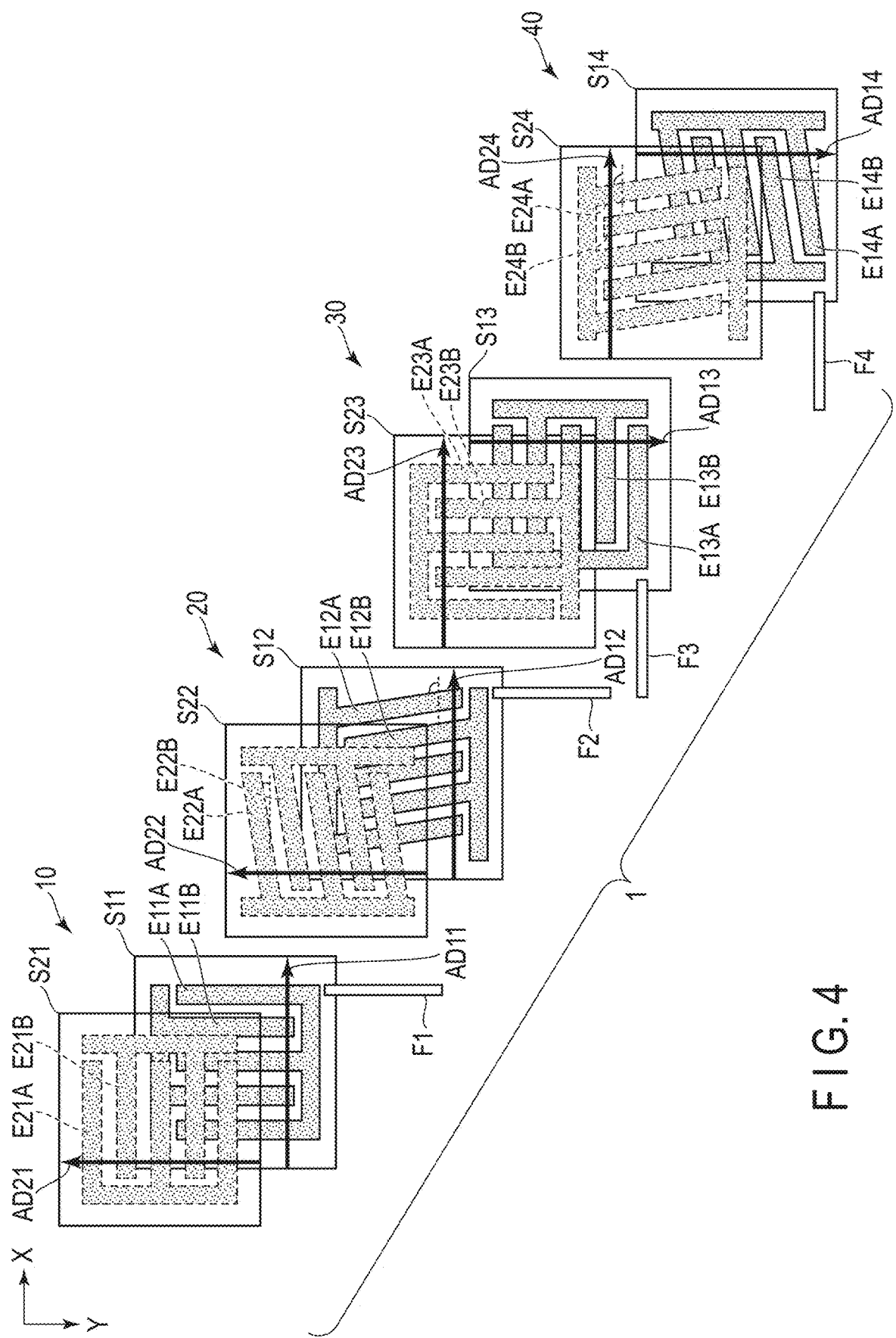
FIG. 4 is a diagram showing an example of the extension direction of each strip electrode that constitutes the liquid crystal device 1.

FIG. 4 is a diagram showing an example of the extension direction of each strip electrode that constitutes the liquid crystal device 1.

In the first liquid crystal cell 10, the alignment treatment direction AD11 is a direction of 0° with respect to the first direction X, and the alignment treatment direction AD21 is a direction of 90° with respect to the first direction X. The extension directions of the first strip electrode E11A and the second strip electrode E11B are directions of 90° with respect to the first direction X, and the extension directions of the third strip electrode E21A and the fourth strip electrode E21B are directions of 0° with respect to the first direction X. The extension direction of each of the first strip electrode E11A and the second strip electrode E11B is orthogonal to the extension direction of each of the third strip electrode E21A and the fourth strip electrode E21B.

In the second liquid crystal cell 20, the alignment treatment direction AD12 is a direction of 0°, the alignment treatment direction AD22 is a direction of 90°, the extension directions of the first strip electrode E12A and the second strip electrode E12B are directions of 91°, and the extension directions of the third strip electrode E22A and the fourth strip electrode E22B are directions of 1°. The extension direction of each of the first strip electrode E12A and the second strip electrode E12B is orthogonal to the extension direction of each of the third strip electrode E22A and the fourth strip electrode E22B.

In the third liquid crystal cell 30, the alignment treatment direction AD13 is a direction of −90°, the alignment treatment direction AD23 is a direction of 0°, the extension directions of the first strip electrode E13A and the second strip electrode E13B are directions of 0°, and the extension directions of the third strip electrode E23A and the fourth strip electrode E23B are directions of 90°. The extension direction of each of the first strip electrode E13A and the second strip electrode E13B is orthogonal to the extension directions of each of the third strip electrode E23A and the fourth strip electrode E23B.

In the fourth liquid crystal cell 40, the alignment treatment direction AD14 is a direction of −90°, the alignment treatment direction AD24 is a direction of 0°, the extension directions of the first strip electrode E14A and the second strip electrode E14B are directions of 1°, and the extension directions of the third strip electrode E24A and the fourth strip electrode E24B are directions of 91°. The extension direction of each of the first strip electrode E14A and the second strip electrode E14B is orthogonal to the extension direction of each of the third strip electrode E24A and the fourth strip electrode E24B.

The flexible wiring board F1 connected to the first transparent substrate S11 and the flexible wiring board F2 connected to the first transparent substrate S12 are pulled out downward in the figure. The flexible wiring board F3 connected to the first transparent substrate S13 and the flexible wiring board F4 connected to the first transparent substrate S14 are pulled out to the left side of the figure.

A mutual relationship between the liquid crystal cells will be described.

The first liquid crystal cell 10 and the p second liquid crystal cell 20 will be focused. The extension direction of each of the first strip electrode E11A and the second strip electrode E11B intersects with the extension direction of each of the first strip electrode E12A and the second strip electrode E12B at an angle other than 90°. In the present specification, intersecting at an angle other than 90° means that the angle of intersection between both the electrodes in plan view is an acute angle greater than 0° and less than 90°, and is synonymous with being not parallel and not orthogonal.

The extension direction of each of the first strip electrode E21A and the second strip electrode E21B intersects with the extension directions of each of the first strip electrode E22A and the second strip electrode E22B at an angle other than 90°. In one example, the angle of the intersection between the first strip electrode E11A and the first strip electrode E12A, and the angle of the intersection between the third strip electrode E21A and the third strip electrode E22A are 1°.

In short, when the first liquid crystal cell 10 and the second liquid crystal cell 20 are adhered, the first strip electrode E11A and the second strip electrode E11B, the first strip electrode E12A and the second strip electrode E12B, the third strip electrode E21A and the fourth strip electrode E21B, and the third strip electrode E22A and the fourth strip electrode E22B are not the same as each other in terms of the extension directions (i.e., non-parallel to each other). Thus, moire can be suppressed since there are no electrodes that completely overlap each other.

The example in which the angle of intersection is 1° has been described, but the angle of intersection is not limited to this. From the viewpoint of suppressing moire, for example, the angle of intersection is desirably greater than 0°, and less than or equal to 4°.

Although the mutual relationship between the first liquid crystal cell 10 and the second liquid crystal cell 20 has been described here, the mutual relationship is the same as the mutual relationship between the third liquid crystal cell 30 and the fourth liquid crystal cell 40.

Next, the first liquid crystal cell 10 and the third liquid crystal cell 30 will be focused. The extension direction of each of the first strip electrode E11A and the second strip electrode E11B, and the extension direction of each of the first strip electrode E13A and the second strip electrode E13B are orthogonal to each other. In addition, the extension direction of each of the third strip electrode E21A and the fourth strip electrode E21B, and the extension direction of each of the third strip electrode E23A and the fourth strip electrode E23B are orthogonal to each other.

When the first liquid crystal cell 10 is rotated clockwise at 90° on the X-Y plane, the extension directions of the first strip electrode E11A and the second strip electrode E11B are the same as the extension directions of the first strip electrode E13A and the second strip electrode E13B, and the extension directions of the third strip electrode E21A and the fourth strip electrode E21B are the same as the extension directions of the third strip electrode E23A and the fourth strip electrode E23B.

In short, the first strip electrode E11A and the second strip electrode E11B, and the first strip electrode E13A and the second strip electrode E13B have rotational symmetry of 90°, on the X-Y plane. Similarly, the third strip electrode E21A and the fourth strip electrode E21B, and the third strip electrode E23A and the fourth strip electrode E23B have rotational symmetry of 90°. In other words, the first liquid crystal cell 10 and the third liquid crystal cell 30 have rotational symmetry of 90°, and the first liquid crystal cell 10 can be used as the third liquid crystal cell 30 by being rotated clockwise at 90° on the X-Y plane. Therefore, the costs can be reduced as compared with a case of separately preparing the first liquid crystal cell 10 and the third liquid crystal cell 30.

In addition, even when the first liquid crystal cell 10, the second liquid crystal cell 20, and the third liquid crystal cell 30 are adhered to each other, or when the first transparent substrates of each liquid crystal cell are viewed or the second transparent substrates are viewed, there are no electrodes that completely overlap each other, and moire can be thereby suppressed.

Although the mutual relationship between the first liquid crystal cell 10 and the third liquid crystal cell 30 has been described here, the mutual relationship is the same as the mutual relationship between the second liquid crystal cell 20 and the fourth liquid crystal cell 40. In other words, the second liquid crystal cell 20 and the fourth liquid crystal cell 40 have rotational symmetry of 90°, and the second liquid crystal cell 20 can be used as the fourth liquid crystal cell 40 by being rotated clockwise at 90° on the X-Y plane. Therefore, the costs can be reduced as compared with a case of separately preparing the second liquid crystal cell 20 and the fourth liquid crystal cell 40. Therefore, the liquid crystal device 1 in which the above-described liquid crystal cells 10 to 40 are stacked can be configured by preparing two types of liquid crystal cells different in extension direction of the strip electrode.

In addition, even when the first liquid crystal cell 10, the second liquid crystal cell 20, the third liquid crystal cell 30, and the fourth liquid crystal cell 40 are adhered to each other, or when the first transparent substrates of each liquid crystal cell are viewed or the second transparent substrates are viewed, there are no electrodes that completely overlap each other, and moire can be thereby suppressed.

Figure 5:
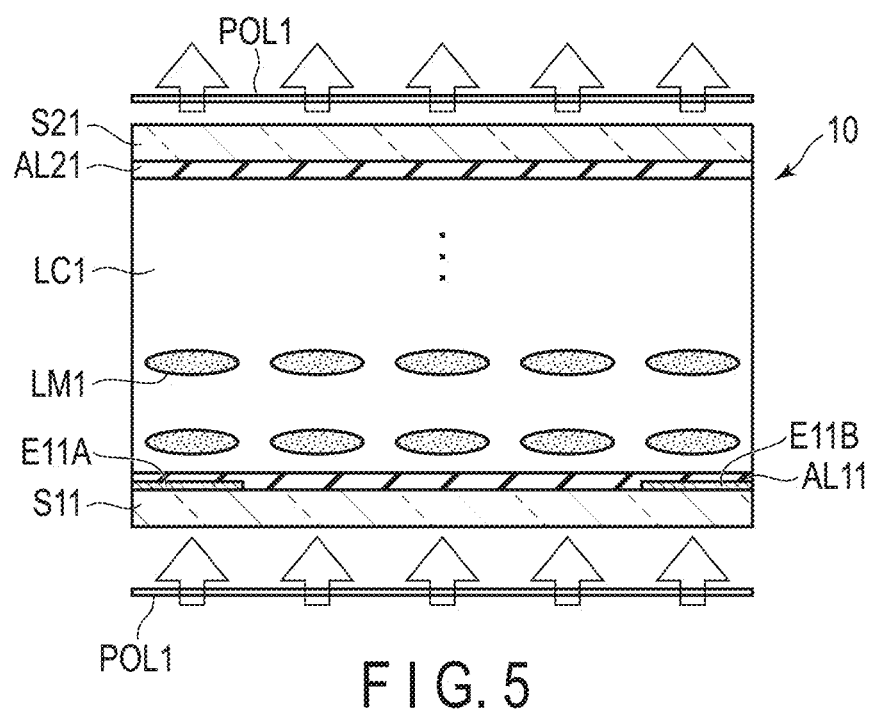
FIG. 5 is a diagram schematically showing a first liquid crystal cell 10 in an off state (OFF) in which no electric field is formed in a liquid crystal layer LC1.
Figure 6:
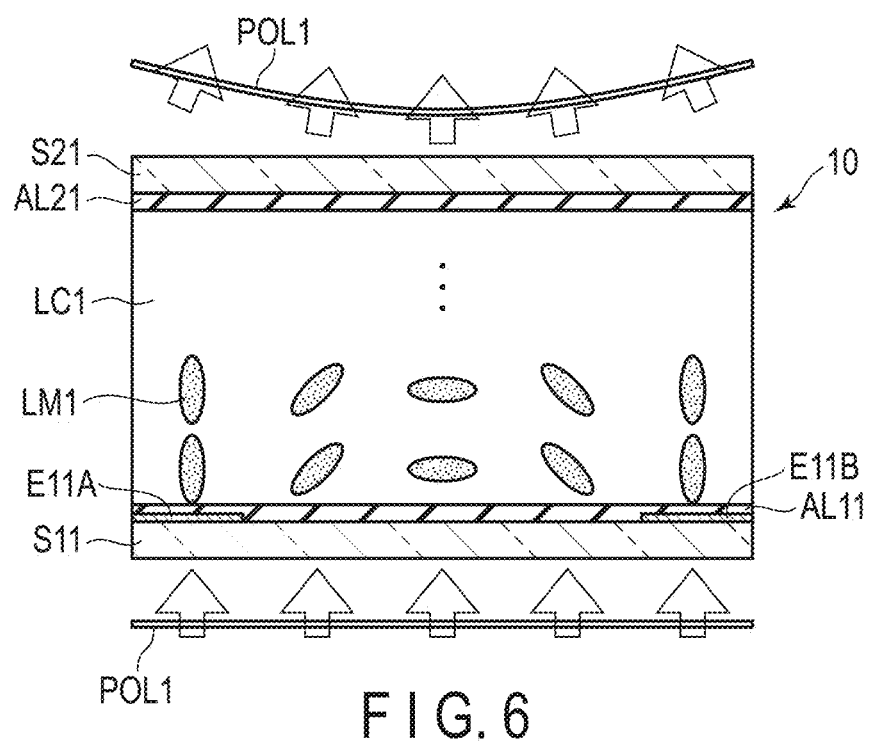
FIG. 6 is a diagram schematically showing the first liquid crystal cell 10 in an on state (ON) in which an electric field is formed in the liquid crystal layer LC1.

An optical action at the first liquid crystal cell 10 will be described with reference to FIG. 5 and FIG. 6. FIG. 5 and FIG. 6 show only configurations necessary for description of the liquid crystal molecules LM1 in the vicinity of the first transparent substrate S11, and the like. In addition, in FIG. 5 and FIG. 6, the light from the light source is made incident from the first transparent substrate S11 side, unlike FIG. 4.

FIG. 5 is a diagram schematically showing a first liquid crystal cell 10 in an off state (OFF) in which no electric field is formed in a liquid crystal layer LC1.

In the liquid crystal layer LC1 in the off state, the liquid crystal molecules LM1 maintain their initial alignment state. In such an off state, the liquid crystal layer LC1 has a substantially uniform refractive index distribution. For this reason, the polarization component POL1, which is the incident light on the first liquid crystal cell 10, is hardly refracted (or diffused), and passes through the liquid crystal layer LC1.

As shown in FIG. 3, the initial alignment directions of the liquid crystal molecules between upper and lower transparent substrates intersect at 90°, in the liquid crystal cell. Therefore, although the liquid crystal molecules of the liquid crystal layer are aligned in the X direction on the first transparent substrate side, the direction is gradually changed from the X direction to the Y direction toward the second transparent substrate side, and the liquid crystal molecules are aligned in the Y direction on the second substrate side. The direction of the polarization component changes according to the change in the alignment of the liquid crystal layer. More specifically, the polarization component having a polarization axis in the X direction changes its polarization axis to the Y direction during the process of passing through the liquid crystal layer. On the other hand, the polarization component having a polarization axis in the Y direction changes its polarization axis from the Y direction to the X direction during the process of passing through the liquid crystal layer. Therefore, when viewed from these polarization components orthogonal to each other, the polarization axes are exchanged in the process of passing through the liquid crystal cell. In the following description, the action of changing the direction of the polarization axis may be referred to as optical rotation.

FIG. 6 is a diagram schematically showing the first liquid crystal cell 10 in an on state (ON) in which an electric field is formed in the liquid crystal layer LC1.

In the on state, a potential difference is generated between the first strip electrode E11A and the second strip electrode E11B, and an electric field is thereby formed in the liquid crystal layer LC1. For example, when the liquid crystal layer LC1 has a positive dielectric anisotropy, the liquid crystal molecules LM1 are aligned in a convex arc shape between the adjacent electrodes such that the long axis is aligned with the electric field. However, a range in which the electric field between the first strip electrode E11A and the second strip electrode E11B reaches is mainly approximately half a thickness of the liquid crystal layer LC1. For this reason, as shown in FIG. 6, an area in which the liquid crystal molecules LM1 are aligned substantially orthogonally to the substrate, an area in which the liquid crystal molecules LM1 are aligned obliquely to the substrate, and an area in which the liquid crystal molecules LM1 are aligned substantially horizontally with respect to the substrate, and the like are formed, in a range close to the first transparent substrate S11, of the liquid crystal layer LC1.

The liquid crystal molecules LM1 have refractive anisotropy Δn. For this reason, the liquid crystal layer LC1 in the on state has a refractive index distribution or retardation distribution according to the aligned state of the liquid crystal molecules LM1. The retardation is assumed to be represented by Δn·d where the thickness of the liquid crystal layer LC1 is referred to as d.

Positive liquid crystal is employed as the liquid crystal layer in the present example, but negative liquid crystal can also be employed by considering the alignment direction and the like.

In such an on state, the polarization component POL1 is affected by the refractive index distribution of the liquid crystal layer LC1 and diffused when passing through the liquid crystal layer LC1. More specifically, the polarization component having a polarization axis in the X direction is affected by the refractive index distribution of the liquid crystal layer, diffuses in the X direction, and rotates in the Y direction. On the other hand, the polarization component having a polarization axis in the Y direction is not affected by the refractive index distribution, does not diffuse but only rotates in the X direction, and passes through the liquid crystal layer.

It has been described with reference to FIG. 6 that the electric field is formed by the potential difference between the first strip electrode E11A and the second strip electrode E11B but, when the incident light is diffused at the first liquid crystal cell 10, an electric field is desirably formed due to the potential difference between the third strip electrode E21A and the fourth strip electrode E21B. As a result, the aligned states of not only the liquid crystal molecules in the vicinity of the first transparent substrate S11, but also the liquid crystal molecules in the vicinity of the second transparent substrate S21 are controlled, and a predetermined refractive index distribution is formed in the liquid crystal layer LC1.

More specifically, the liquid crystal layer on the second transparent substrate side also has a refractive index distribution, and the polarization component rotating in the Y direction is thereby diffused in the process of passing through the liquid crystal layer. In other words, the polarization component diffused on the first transparent substrate side is further diffused in the Y direction on the second transparent substrate side and emitted from the liquid crystal cell. On the other hand, the polarization components rotating in the X direction in the process of passing through the liquid crystal layer is emitted from the liquid crystal cell without being affected by the refractive index distribution.

Such diffusion and rotation of the polarization components also occur in the second liquid crystal cell. In other words, the polarization component having a polarization axis in the X direction emitted from the light source changes its polarization axis from the X direction to the Y direction by passing through the first liquid crystal, and further changes the polarization axis from the Y direction to the X direction by passing through the second liquid crystal. In addition, when the liquid crystal molecules parallel to the polarization component have a refractive index distribution in this process, the polarization component is diffused according to the refractive index distribution. Similarly, the polarization component having a polarization axis in the Y direction, which is emitted from the light source, changes its polarization axis from the Y direction to the X direction by passing through the first liquid crystal, and further changes the polarization axis from the X direction to the Y direction by passing through the second liquid crystal. In addition, when the liquid crystal molecules parallel to the polarization component have a refractive index distribution in this process, the polarization component is diffused according to the refractive index distribution. The same phenomenon also occurs in the third liquid crystal cell and the fourth liquid crystal cell but, since the cells are obtained by rotating the first and second liquid crystal cells at 90°, the polarization components exerting the diffusion action are replaced.

In other words, in the structure in which the first liquid crystal cell 10, the second liquid crystal cell 20, the third liquid crystal cell 30, and the fourth liquid crystal cell 40 are stacked, for example, the first liquid crystal cell 10 and the fourth liquid crystal cell 40 are configured to scatter (diffuse) the polarization component POL1 which is, mainly, p-polarized light, and the second liquid crystal cell 20 and the third liquid crystal cell 30 are configured to scatter (diffuse) the polarization component POL2 which is, mainly, s-polarized light.

As described above, each of the first liquid crystal cell 10, the second liquid crystal cell 20, the third liquid crystal cell 30, and the fourth liquid crystal cell 40 is configured not to include electrodes extending in the same direction. For this reason, the liquid crystal layers of the respective liquid crystal cells form refractive index distributions different from each other, in the on state. As a result, an interference action of the light transmitted through each liquid crystal cell is reduced, and moire can be suppressed.

Example 1-1

Figure 7:
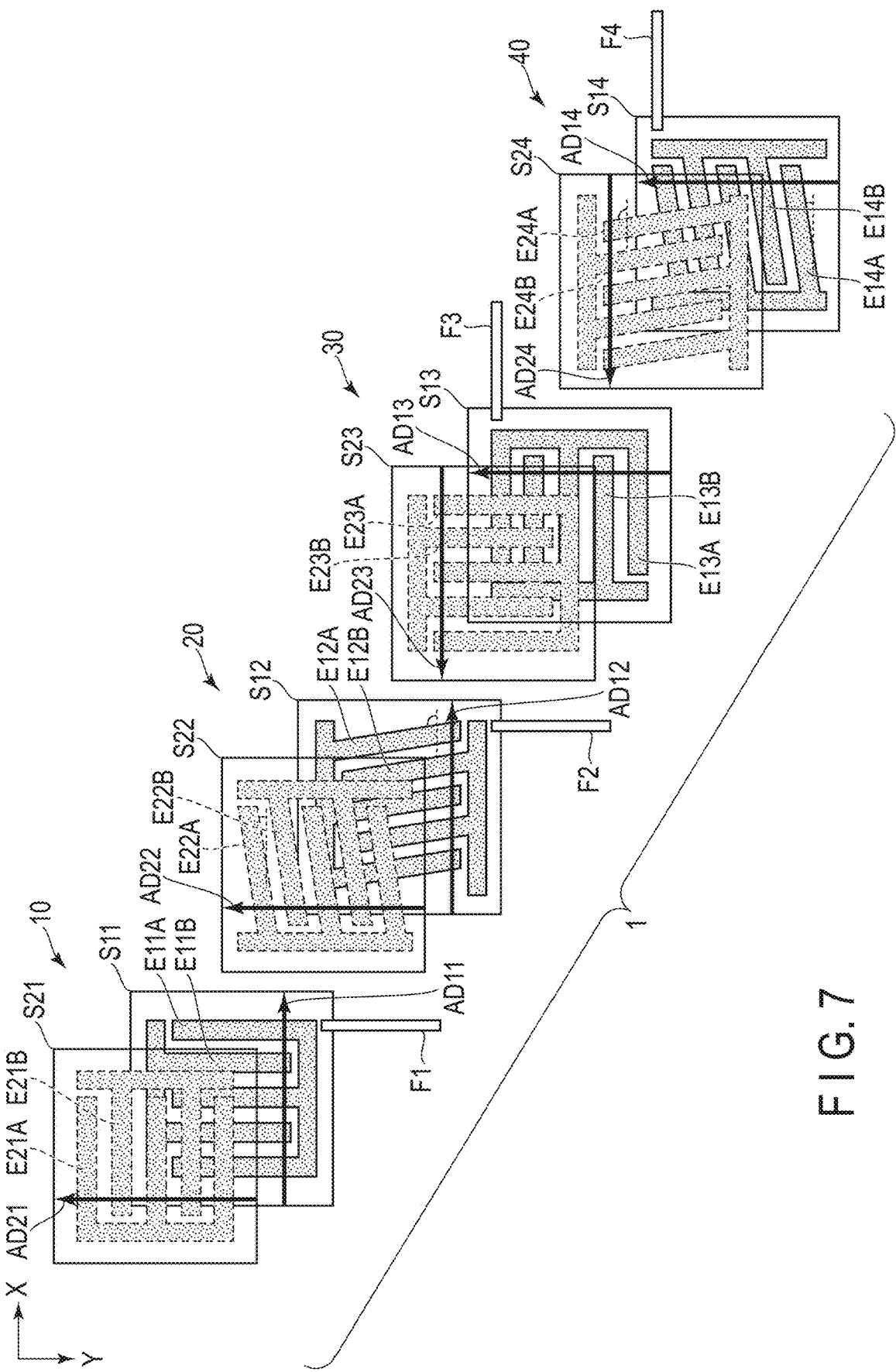
FIG. 7 is a diagram showing another example of the extension direction of each strip electrode that constitutes the liquid crystal device 1.

FIG. 7 is a diagram showing another example of the extension direction of each strip electrode that constitutes the liquid crystal device 1.

In the first liquid crystal cell 10, the alignment treatment direction AD11 is a direction of 0°, and the alignment treatment direction AD21 is a direction of 90°. The extension directions of the first strip electrode E11A and the second strip electrode E11B are directions of 90°, and the extension directions of the third strip electrode E21A and the fourth strip electrode E21B are directions of 0°.

In the second liquid crystal cell 20, the alignment treatment direction AD12 is a direction of 0°, the alignment treatment direction AD22 is a direction of 90°, the extension directions of the first strip electrode E12A and the second strip electrode E12B are directions of 91°, and the extension directions of the third strip electrode E22A and the fourth strip electrode E22B are directions of 1°.

In the third liquid crystal cell 30, the alignment treatment direction AD13 is a direction of 90°, the alignment treatment direction AD23 is a direction of 180°, the extension directions of the first strip electrode E13A and the second strip electrode E13B are directions of 0°, and the extension directions of the third strip electrode E23A and the fourth strip electrode E23B are directions of 90°.

In the fourth liquid crystal cell 40, the alignment treatment direction AD14 is a direction of 90°, the alignment treatment direction AD24 is a direction of 180°, the extension directions of the first strip electrode E14A and the second strip electrode E14B are directions of 1°, and the extension directions of the third strip electrode E24A and the fourth strip electrode E24B are directions of 91°.

The first liquid crystal cell 10 can be used as the third liquid crystal cell 30 by being rotated counterclockwise at 90° on the X-Y plane. In addition, the second liquid crystal cell 20 can be used as the fourth liquid crystal cell 40 by being rotated counterclockwise at 90° on the X-Y plane.

Example 1-2

Figure 8:
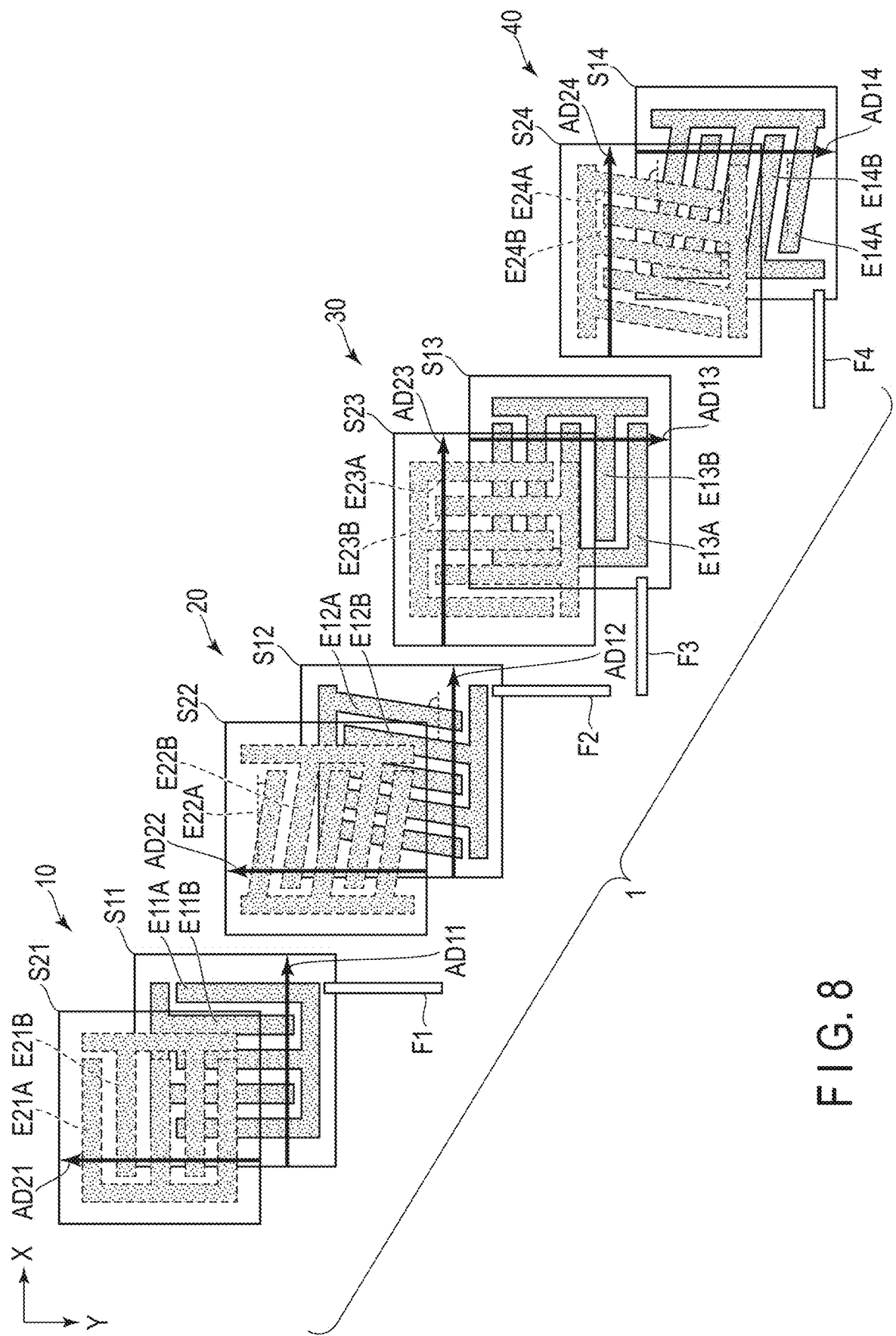
FIG. 8 is a diagram showing yet another example of the extension direction of each strip electrode that constitutes the liquid crystal device 1.

FIG. 8 is a diagram showing yet another example of the extension direction of each strip electrode that constitutes the liquid crystal device 1.

In the first liquid crystal cell 10, the alignment treatment direction AD11 is a direction of 0°, and the alignment treatment direction AD21 is a direction of 90°. The extension directions of the first strip electrode E11A and the second strip electrode E11B are directions of 90°, and the extension directions of the third strip electrode E21A and the fourth strip electrode E21B are directions of 0°.

In the second liquid crystal cell 20, the alignment treatment direction AD12 is a direction of 0°, the alignment treatment direction AD22 is a direction of 90°, the extension directions of the first strip electrode E12A and the second strip electrode E12B are directions of 89°, and the extension directions of the third strip electrode E22A and the fourth strip electrode E22B are directions of −1°.

In the third liquid crystal cell 30, the alignment treatment direction AD13 is a direction of −90°, the alignment treatment direction AD23 is a direction of 0°, the extension directions of the first strip electrode E13A and the second strip electrode E13B are directions of 0°, and the extension directions of the third strip electrode E23A and the fourth strip electrode E23B are directions of 90°.

In the fourth liquid crystal cell 40, the alignment treatment direction AD14 is a direction of −90°, the alignment treatment direction AD24 is a direction of 0°, the extension directions of the first strip electrode E14A and the second strip electrode E14B are directions of −1°, and the extension directions of the third strip electrode E24A and the fourth strip electrode E24B are directions of 89°.

The first liquid crystal cell 10 can be used as the third liquid crystal cell 30 by being rotated clockwise at 90° on the X-Y plane. In addition, the second liquid crystal cell 20 can be used as the fourth liquid crystal cell 40 by being rotated clockwise at 90° on the X-Y plane.

Example 1-3

Figure 9:
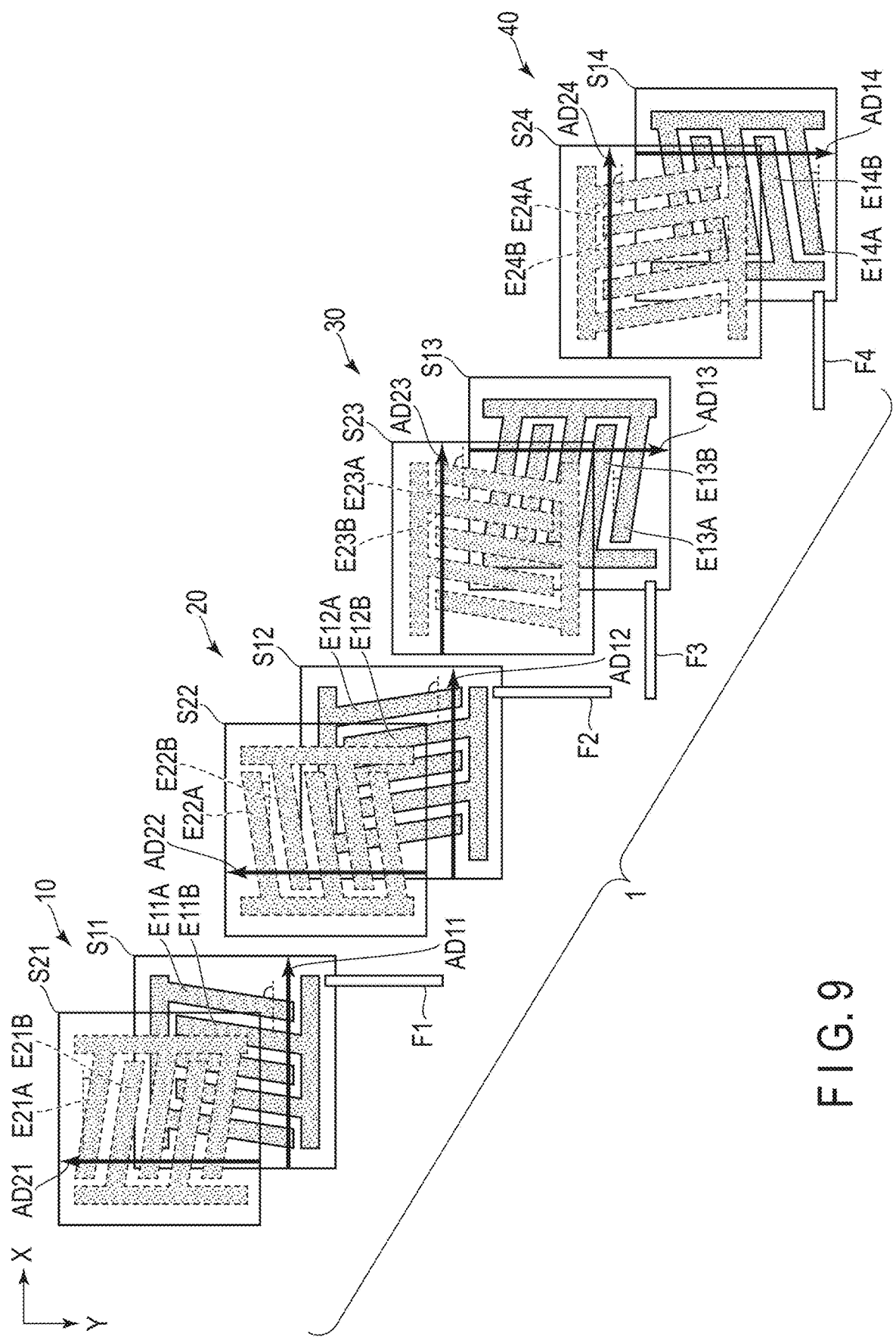
FIG. 9 is a diagram showing yet another example of the extension direction of each strip electrode that constitutes the liquid crystal device 1.

FIG. 9 is a diagram showing yet another example of the extension direction of each strip electrode that constitutes the liquid crystal device 1.

In the first liquid crystal cell 10, the alignment treatment direction AD11 is a direction of 0°, and the alignment treatment direction AD21 is a direction of 90°. The extension directions of the first strip electrode E11A and the second strip electrode E11B are directions of 89°, and the extension directions of the third strip electrode E21A and the fourth strip electrode E21B are directions of −1°.

In the second liquid crystal cell 20, the alignment treatment direction AD12 is a direction of 0°, the alignment treatment direction AD22 is a direction of 90°, the extension directions of the first strip electrode E12A and the second strip electrode E12B are directions of 91°, and the extension directions of the third strip electrode E22A and the fourth strip electrode E22B are directions of 1°.

In the third liquid crystal cell 30, the alignment treatment direction AD13 is a direction of −90°, the alignment treatment direction AD23 is a direction of 0°, the extension directions of the first strip electrode E13A and the second strip electrode E13B are directions of −1°, and the extension directions of the third strip electrode E23A and the fourth strip electrode E23B are directions of 89°.

In the fourth liquid crystal cell 40, the alignment treatment direction AD14 is a direction of −90°, the alignment treatment direction AD24 is a direction of 0°, the extension directions of the first strip electrode E14A and the second strip electrode E14B are directions of 1°, and the extension directions of the third strip electrode E24A and the fourth strip electrode E24B are directions of 91°.

The first liquid crystal cell 10 can be used as the third liquid crystal cell 30 by being rotated clockwise at 90° on the X-Y plane. In addition, the second liquid crystal cell 20 can be used as the fourth liquid crystal cell 40 by being rotated clockwise at 90° on the X-Y plane.

Example 1-3

FIG. 10 is a diagram showing yet another example of the extension of direction of each strip electrode that constitutes the liquid crystal device 1.

In the first liquid crystal cell 10, the alignment treatment direction AD11 is a direction of 0°, and the alignment treatment direction AD21 is a direction of 90°. The extension directions of the first strip electrode E11A and the second strip electrode E11B are directions of 89°, and the extension directions of the third strip electrode E21A and the fourth strip electrode E21B are directions of −1°.

In the second liquid crystal cell 20, the first transparent substrate S12 is opposed to the first liquid crystal cell 10, and the second transparent substrate S22 is opposed to the third liquid crystal cell 30. The alignment treatment direction AD12 is a direction of −90°, the alignment treatment direction AD22 is a direction of 180°, the extension directions of the first strip electrode E12A and the second strip electrode E12B are directions of 1°, and the extension directions of the third strip electrode E22A and the fourth strip electrode E22B are directions of 91°.

In the third liquid crystal cell 30, the alignment treatment direction AD13 is a direction of −90°, the alignment treatment direction AD23 is a direction of 0°, the extension directions of the first strip electrode E13A and the second strip electrode E13B are directions of −1°, and the extension directions of the third strip electrode E23A and the fourth strip electrode E23B are directions of 89°.

In the fourth liquid crystal cell 40, the first transparent substrate S14 is opposed to the third liquid crystal cell 30. The alignment treatment direction AD14 is a direction of 180°, the alignment treatment direction AD24 is a direction of 90°, the extension directions of the first strip electrode E14A and the second strip electrode E14B are directions of 91°, and the extension directions of the third strip electrode E24A and the fourth strip electrode E24B are directions of 1°.

The first liquid crystal cell 10 can be used as the second liquid crystal cell 20 by being rotated clockwise at 90° on the X-Y plane and turned upside down. In addition, the first liquid crystal cell 10 can be used as the third liquid crystal cell 30 by being rotated clockwise at 90° on the X-Y plane. Furthermore, the second liquid crystal cell 20 can be used as the fourth liquid crystal cell 40 by being rotated clockwise at 90° on the X-Y plane. In other words, the liquid crystal device 1 in which the above-described liquid crystal cells 10 to 40 are stacked can be configured by preparing one type of liquid crystal cell.

In the above-described examples 1-1 to 1-3', the alignment treatment direction of one alignment film of each liquid crystal cell is parallel to the first direction X (i.e., the direction of 0° or the direction of 180°), and the alignment treatment direction of the other alignment film is parallel to the second direction Y (i.e., the direction of 90° or the direction of −90°). As for the first liquid crystal cell 10 and the second liquid crystal cell 20, the extension direction of the first strip electrode is orthogonal to or intersects with the first direction X at an angle other than 90°, and the extension direction of the third strip electrode is orthogonal to or intersects with the second direction Y at an angle other than 90°. Incidentally, being orthogonal or intersecting at an angle other than 90° means that the angle of intersection between the both directions in plan view is greater than 0° and equal to or less than 90°, and is synonymous with being non-parallel.

In examples 1-1, 1-1', and 1-2 described above, the extension direction of the first strip electrode E11A in the first liquid crystal cell 10 is parallel to the second direction Y, and the extension direction of the third strip electrode E21A is parallel to the first direction X. In addition, the extension direction of the first strip electrode E12A in the second liquid crystal cell 20 intersects with the second direction Y at an angle other than 90°, and the extension direction of the third strip electrode E22A intersects with the first direction X at an angle other than 90°.

In addition, the extension direction of the first strip electrode E11A in the first liquid crystal cell 10 is orthogonal to the alignment treatment direction AD11 of the first alignment film covering the first strip electrode E11A, and the extension direction of the first strip electrode E12A in the second liquid crystal cell 20 intersects with the alignment treatment direction AD12 of the first alignment film covering the first strip electrode E12A at an angle other than 90°.

In examples 1-3 and 1-3' described above, each of the extension direction of the first strip electrode E11A in the first liquid crystal cell 10 and the extension direction of the first strip electrode E12A in the second liquid crystal cell 20 intersects with the second direction Y at an angle other than 90°. In addition, each of the extension direction of the third strip electrode E21A in the first liquid crystal cell 10, and the extension direction of the third strip electrode E22A, intersects with the first direction X at an angle other than 90°.

In addition, the extension direction of the first strip electrode E11A in the first liquid crystal cell 10 intersects with the alignment treatment direction AD11 of the first alignment film covering the first strip electrode E11A at an angle other than 90°, and the extension direction of the first strip electrode E12A in the second liquid crystal cell 20 intersects with the alignment treatment direction AD12 of the first alignment film covering the first strip electrode E12A at an angle other than 90°.

Example 2-1

Figure 11:
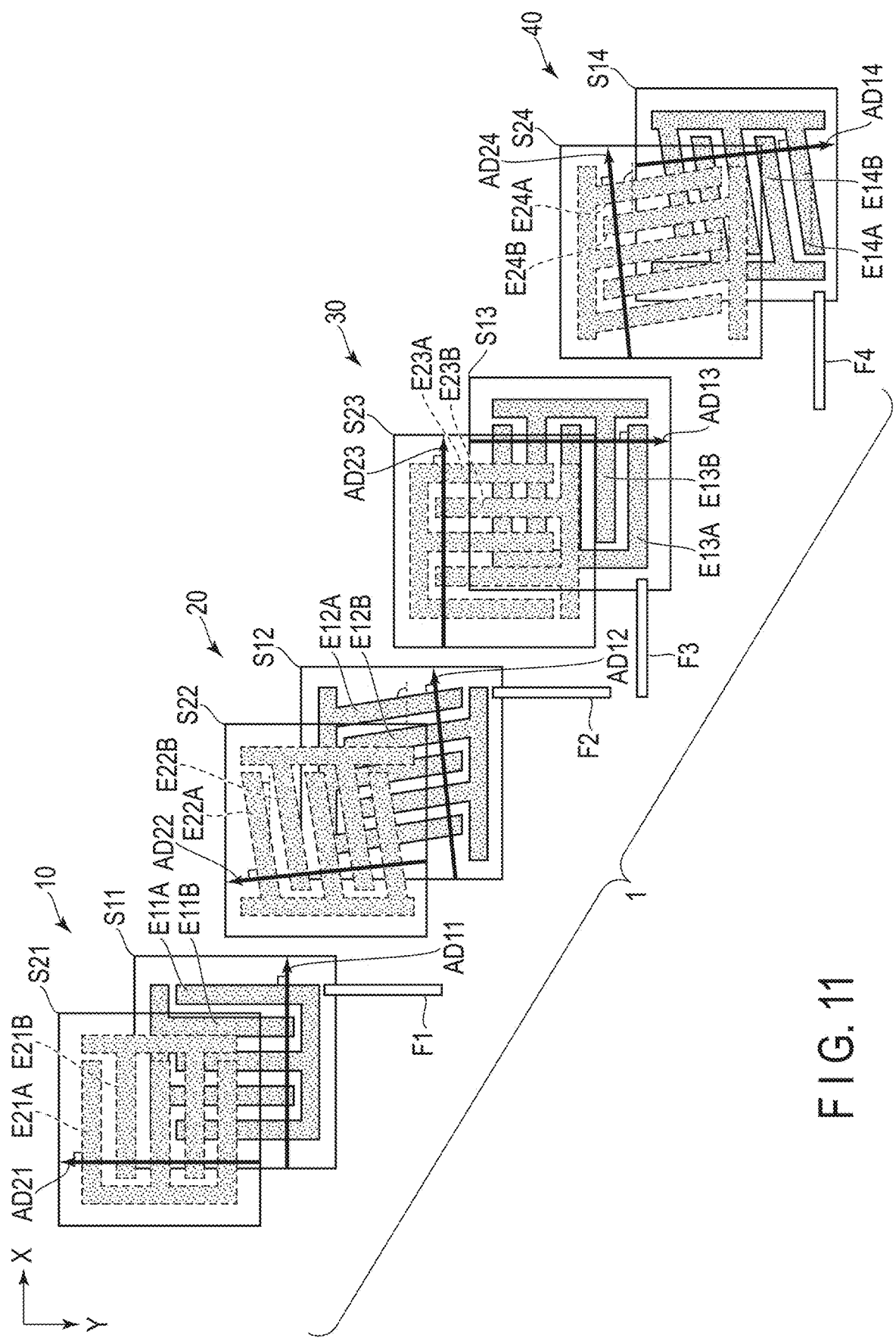
FIG. 11 is a diagram showing yet another example of the extension of direction of each strip electrode that constitutes the liquid crystal device 1.

FIG. 11 is a diagram showing yet another example of the extension of direction of each strip electrode that constitutes the liquid crystal device 1.

In the first liquid crystal cell 10, the alignment treatment direction AD11 is a direction of 0°, and the alignment treatment direction AD21 is a direction of 90°. The extension directions of the first strip electrode E11A and the second strip electrode E11B are directions of 90°, and the extension directions of the third strip electrode E21A and the fourth strip electrode E21B are directions of 0°.

In the second liquid crystal cell 20, the alignment treatment direction AD12 is a direction of 1°, the alignment treatment direction AD22 is a direction of 91°, the extension directions of the first strip electrode E12A and the second strip electrode E12B are directions of 91°, and the extension directions of the third strip electrode E22A and the fourth strip electrode E22B are directions of 1°.

In the third liquid crystal cell 30, the alignment treatment direction AD13 is a direction of −90°, the alignment treatment direction AD23 is a direction of 0°, the extension directions of the first strip electrode E13A and the second strip electrode E13B are directions of 0°, and the extension directions of the third strip electrode E23A and the fourth strip electrode E23B are directions of 90°.

In the fourth liquid crystal cell 40, the alignment treatment direction AD14 is a direction of −89°, the alignment treatment direction AD24 is a direction of 1°, the extension directions of the first strip electrode E14A and the second strip electrode E14B are directions of 1°, and the extension directions of the third strip electrode E24A and the fourth strip electrode E24B are directions of 91°.

The first liquid crystal cell 10 and the third liquid crystal cell 30 have rotational symmetry of 90°, and the first liquid crystal cell 10 can be used as the third liquid crystal cell 30 by being rotated clockwise at 90° on the X-Y plane. In addition, the second liquid crystal cell 20 and the fourth liquid crystal cell 40 have rotational symmetry of 90°, and the second liquid crystal cell 20 can be used as the fourth liquid crystal cell 40 by being rotated clockwise at 90° on the X-Y plane.

Example 2-2

Figure 12:
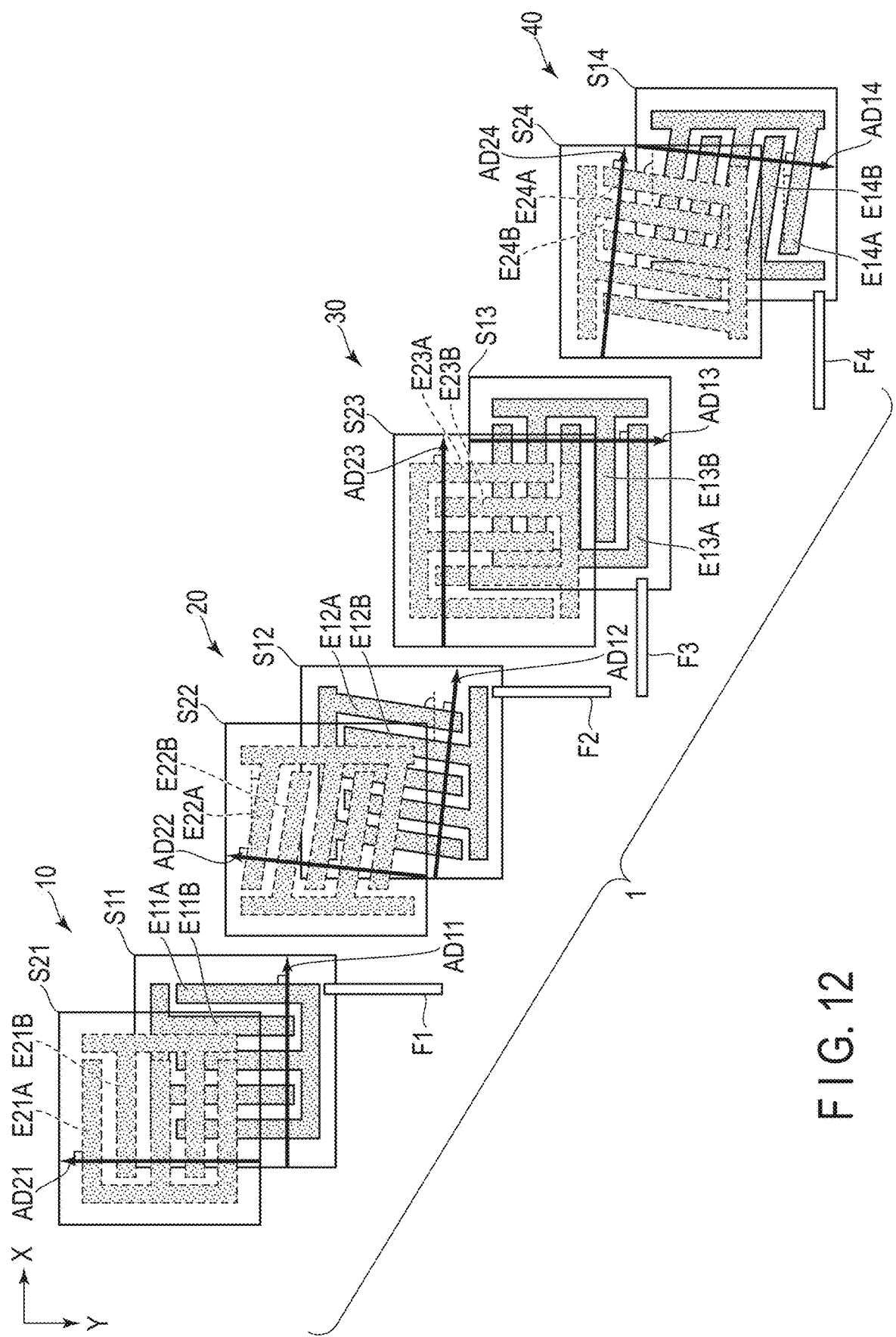
FIG. 12 is a diagram showing yet another example of the extension of direction of each strip electrode that constitutes the liquid crystal device 1.

FIG. 12 is a diagram showing yet another example of the extension of direction of each strip electrode that constitutes the liquid crystal device 1.

In the first liquid crystal cell 10, the alignment treatment direction AD11 is a direction of 0°, and the alignment treatment direction AD21 is a direction of 90°. The extension directions of the first strip electrode E11A and the second strip electrode E11B are directions of 90°, and the extension directions of the third strip electrode E21A and the fourth strip electrode E21B are directions of 0°.

In the second liquid crystal cell 20, the alignment treatment direction AD12 is a direction of −1°, the alignment treatment direction AD22 is a direction of 89°, the extension directions of the first strip electrode E12A and the second strip electrode E12B are directions of 89°, and the extension directions of the third strip electrode E22A and the fourth strip electrode E22B are directions of −1°.

In the third liquid crystal cell 30, the alignment treatment direction AD13 is a direction of −90°, the alignment treatment direction AD23 is a direction of 0°, the extension directions of the first strip electrode E13A and the second strip electrode E13B are directions of 0°, and the extension directions of the third strip electrode E23A and the fourth strip electrode E23B are directions of 90°.

In the fourth liquid crystal cell 40, the alignment treatment direction AD14 is a direction of −91°, the alignment treatment direction AD24 is a direction of −1°, the extension directions of the first strip electrode E14A and the second strip electrode E14B are directions of −1°, and the extension directions of the third strip electrode E24A and the fourth strip electrode E24B are directions of 89°.

The first liquid crystal cell 10 can be used as the third liquid crystal cell 30 by being rotated clockwise at 90° on the X-Y plane. In addition, the second liquid crystal cell 20 can be used as the fourth liquid crystal cell 40 by being rotated clockwise at 90° on the X-Y plane.

Example 2-3

Figure 13:
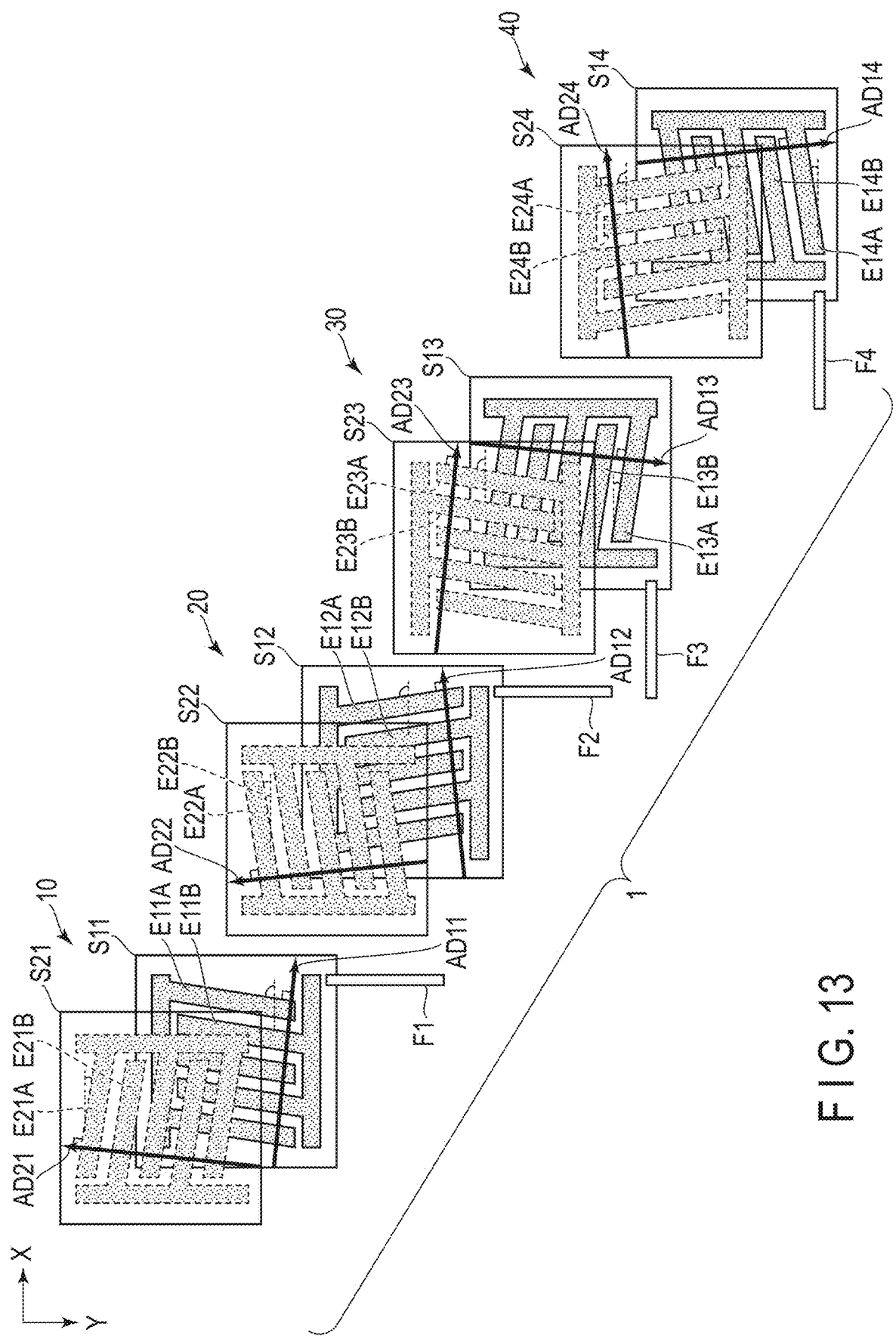
FIG. 13 is a diagram showing yet another example of the extension of direction of each strip electrode that constitutes the liquid crystal device 1.

FIG. 13 is a diagram showing yet another example of the extension of direction of each strip electrode that constitutes the liquid crystal device 1.

In the first liquid crystal cell 10, the alignment treatment direction AD11 is a direction of −1°, and the alignment treatment direction AD21 is a direction of 89°. The extension directions of the first strip electrode E11A and the second strip electrode E11B are directions of 89°, and the extension directions of the third strip electrode E21A and the fourth strip electrode E21B are directions of −1°.

In the second liquid crystal cell 20, the alignment treatment direction AD12 is a direction of 1°, the alignment treatment direction AD22 is a direction of 91°, the extension directions of the first strip electrode E12A and the second strip electrode E12B are directions of 91°, and the extension directions of the third strip electrode E22A and the fourth strip electrode E22B are directions of 1°.

In the third liquid crystal cell 30, the alignment treatment direction AD13 is a direction of −91°, the alignment treatment direction AD23 is a direction of −1°, the extension directions of the first strip electrode E13A and the second strip electrode E13B are directions of −1°, and the extension directions of the third strip electrode E23A and the fourth strip electrode E23B are directions of 89°.

In the fourth liquid crystal cell 40, the alignment treatment direction AD14 is a direction of −89°, the alignment treatment direction AD24 is a direction of 1°, the extension directions of the first strip electrode E14A and the second strip electrode E14B are directions of 1°, and the extension directions of the third strip electrode E24A and the fourth strip electrode E24B are directions of 91°.

The first liquid crystal cell 10 can be used as the third liquid crystal cell 30 by being rotated clockwise at 90° on the X-Y plane. In addition, the second liquid crystal cell 20 can be used as the fourth liquid crystal cell 40 by being rotated clockwise at 90° on the X-Y plane.

In examples 2-1 to 2-3 described above, the extension direction of the first strip electrode of each liquid crystal cell is orthogonal to the alignment treatment direction of the first alignment film covering the first strip electrode, and the extension direction of the third strip electrode is orthogonal to the alignment treatment direction of the second alignment film covering the third strip electrode.

In examples 2-1 and 2-2 described above, the extension direction of the first strip electrode E11A in the first liquid crystal cell 10 is parallel to the second direction Y, and the extension direction of the third strip electrode E21A is parallel to the first direction X. In addition, the extension direction of the first strip electrode E12A in the second liquid crystal cell 20 intersects with the second direction Y at an angle other than 90°, and the extension direction of the third strip electrode E22A intersects with the first direction X at an angle other than 9°.

In addition, the alignment treatment direction AD11 of the first alignment film in the first liquid crystal cell 10 is parallel to the first direction X, and the alignment treatment direction AD21 of the second alignment film is parallel to the second direction Y. In addition, the alignment treatment direction AD12 of the first alignment film in the second liquid crystal cell 20 intersects with the first direction X at an angle other than 90°, and the alignment treatment direction AD22 of the second alignment film intersects with the second direction Y at an angle other than 90°.

In example 2-3 described above, each of the extension direction of the first strip electrode E11A in the first liquid crystal cell 10 and the extension direction of the first strip electrode E12A of the second liquid crystal cell 20 intersects with the second direction Y at an angle other than 90°. In addition, each of the extension direction of the third strip electrode E21A in the first liquid crystal cell 10, and the extension direction of the third strip electrode E22A intersects with the first direction X at an angle other than 90°.

In addition, each of the alignment treatment direction AD11 of the first alignment film in the first liquid crystal cell 10, and the alignment treatment direction AD12 of the first alignment film in the second liquid crystal cell 20 intersects with the first direction X at an angle other than 90°. Each of the alignment treatment direction AD21 of the second alignment film in the first liquid crystal cell 10, and the alignment treatment direction AD22 of the second alignment film in the second liquid crystal cell 20 intersects with the second direction Y at an angle other than 90°.

The liquid crystal device 1 described in each of the above examples comprises four liquid crystal cells, and is configured to scatter p-polarized light with two of the liquid crystal cells and to scatter s-polarized light with the other two liquid crystal cells. However, the liquid crystal device 1 may be composed of one liquid crystal cell which scatters p-polarized light and one liquid crystal cell which scatters s-polarized light. In this case, for example, a combination of the first liquid crystal cell 10 and the second liquid crystal cell 20, a combination of the third liquid crystal cell 30 and the fourth liquid crystal cell 40, a combination of the first liquid crystal cell 10 and the fourth liquid crystal cell 40, and a combination of the second liquid crystal cell 20 and the third liquid crystal cell 30 are applicable, in each of the above-described examples.

According to the embodiments described above, a liquid crystal device capable of suppressing moire can be provided.

All of the liquid crystal devices that can be implemented by a person of ordinary skill in the art through arbitrary design changes to the liquid crystal devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A liquid crystal device comprising:
a first liquid crystal cell; and
a second liquid crystal cell overlapping the first liquid crystal cell, wherein
each of the first liquid crystal cell and the second liquid crystal cell comprises:
a first transparent substrate;
a first alignment film;
a first strip electrode and a second strip electrode located between the first transparent substrate and the first alignment film, arranged at an interval, and configured to have mutually different voltages applied thereto;
a second transparent substrate;
a second alignment film;
a third strip electrode and a fourth strip electrode located between the second transparent substrate and the second alignment film, arranged at an interval, and configured to have mutually different voltages applied thereto; and
a liquid crystal layer located between the first alignment film and the second alignment film,
an extension direction of each of the first strip electrode and the second strip electrode in the first liquid crystal cell intersects with an extension direction of each of the first strip electrode and the second strip electrode in the second liquid crystal cell at an angle other than 45 degrees,
in each of the first liquid crystal cell and the second liquid crystal cell, the extension direction of each of the first strip electrode and the second strip electrode is orthogonal to an extension direction of each of the third strip electrode and the fourth strip electrode in plan view,
when a side of the first transparent substrate is referred to as a reference, a direction orthogonal to the side is referred to as a first direction, and a direction parallel to the side is referred to as a second direction in each of the first liquid crystal cell and the second liquid crystal cell,
an alignment treatment direction of the first alignment film is parallel to the first direction,
an alignment treatment direction of the second alignment film is parallel to the second direction,
the extension direction of the first strip electrode intersects with the first direction, and
the extension direction of the third strip electrode intersects with the second direction.

2. The liquid crystal device of claim 1, wherein
the extension direction of the first strip electrode is orthogonal to the alignment treatment direction of the first alignment film, in the first liquid crystal cell, and
the extension direction of the first strip electrode intersects with the alignment treatment direction of the first alignment film at an angle other than 90°, in the second liquid crystal cell.

3. The liquid crystal device of claim 1, wherein
in each of the first liquid crystal cell and the second liquid crystal cell, the extension direction of the first strip electrode intersects with the alignment treatment direction of the first alignment film at an angle other than 90°.

4. The liquid crystal device of claim 1, wherein
the extension direction of the first strip electrode is orthogonal to the alignment treatment direction of the first alignment film, and
the extension direction of the third strip electrode is orthogonal to the alignment treatment direction of the second alignment film.

5. The liquid crystal device of claim 4, wherein
the alignment treatment direction of the first alignment film intersects with the first direction at an angle other than 90°, and the alignment treatment direction of the second alignment film intersects with the second direction at an angle other than 90°, in the second liquid crystal cell.

6. The liquid crystal device of claim 4, wherein
in each of the first liquid crystal cell and the second liquid crystal cell, the alignment treatment direction of the first alignment film intersects with the first direction at an angle other than 90°, and the alignment treatment direction of the second alignment film intersects with the second direction at an angle other than 90°.

7. The liquid crystal device of claim 1, wherein
the extension direction of the first strip electrode in the first liquid crystal cell is parallel to the second direction.

8. The liquid crystal device of claim 1, wherein
both the extension direction of the first strip electrode in the first liquid crystal cell and the extension direction of the first strip electrode in the second liquid crystal cell intersect with the second direction at an angle other than 90°.

* * * * *